US007066695B1

(12) United States Patent
Nuss

(10) Patent No.: US 7,066,695 B1
(45) Date of Patent: Jun. 27, 2006

(54) ROUTER MOUNTING SYSTEM

(76) Inventor: Bart Nuss, 2408 Running Brook Trail, Fisherville, KY (US) 40023

(*) Notice: Subject to any disclaimer, the term of this patent is extended or adjusted under 35 U.S.C. 154(b) by 239 days.

(21) Appl. No.: 10/744,498

(22) Filed: Dec. 23, 2003

Related U.S. Application Data

(60) Provisional application No. 60/506,993, filed on Sep. 29, 2003.

(51) Int. Cl.
*B23C 1/20* (2006.01)

(52) U.S. Cl. .................................. 409/182; 144/136.95

(58) Field of Classification Search ................ 409/182, 409/181, 180; 144/1.1, 135.2, 137, 136.95, 144/154.5, 286.1, 286.5, 371, 48.3
See application file for complete search history.

(56) References Cited

U.S. PATENT DOCUMENTS

| | | | | |
|---|---|---|---|---|
| D278,440 | S | 4/1985 | Ferdinand et al. | |
| 4,679,606 | A | 7/1987 | Bassett | |
| 5,101,875 | A | 4/1992 | Eckhold et al. | |
| 5,117,879 | A * | 6/1992 | Payne | 409/182 |
| D343,846 | S | 2/1994 | Balolia et al. | |
| 5,289,861 | A * | 3/1994 | Hedrick | 144/135.2 |
| 5,396,937 | A | 3/1995 | Clausen | |
| 5,611,378 | A | 3/1997 | Brazell | |
| 5,699,844 | A | 12/1997 | Witt | |
| 5,715,880 | A | 2/1998 | Tucker et al. | |
| 5,725,038 | A | 3/1998 | Tucker et al. | |
| 5,855,234 | A | 1/1999 | Everts et al. | |
| 5,983,968 | A | 11/1999 | Newman | |
| 6,305,447 | B1 | 10/2001 | Rousseau | |
| D457,176 | S | 5/2002 | Daniels et al. | |
| 6,382,276 | B1 | 5/2002 | Daniels et al. | |
| D467,485 | S | 12/2002 | Daniels et al. | |
| 6,520,224 | B1 * | 2/2003 | Smith | 144/135.2 |
| 6,520,227 | B1 * | 2/2003 | Mc Farlin et al. | 409/226 |
| 6,951,232 | B1 * | 10/2005 | McDonald et al. | 409/182 |

* cited by examiner

Primary Examiner—Boyer D. Ashley
Assistant Examiner—Dana Ross
(74) Attorney, Agent, or Firm—Camoriano and Associates; Theresa Fritz Camoriano

(57) ABSTRACT

A router mounting system is disclosed. A preferred embodiment of the router mounting system includes a router assembly, a first sub-base, and a router table. The router assembly and first sub-base include interlocking radial projections, recesses and discontinuities such that the first sub-base can be firmly attached to the router assembly quickly and without the use of tools or fasteners. This allows a user to interchangeably use a single router either in the hand mode of operation or in the table mode of operation with only a few seconds required to change betweens modes of operation.

20 Claims, 9 Drawing Sheets

ROUTER MOUNTING SYSTEM

CROSS-REFERENCE TO RELATED APPLICATIONS

This application claims priority from U.S. Provisional Application Ser. No. 60/506,993, filed Sep. 29, 2003.

BACKGROUND

1. Field of Invention

This invention relates in general to routers as used in the field of woodworking and, more particularly, to a system for mounting a router to a router table.

2. Description of Prior Art

The router is among the most versatile of woodworking tools. When fitted with a cutting tool, or router bit, and properly guided, it can be used to cut rabbets, dados, mortises, tenons and to perform a variety of other wood shaping operations. A number of accessories are available to make these cuts safer and easier to perform. Perhaps the most versatile of these accessories is the router table. A router table allows for mounting an inverted router below the work surface of the table. An opening in the table allows the router bit to protrude above the work surface. The work piece can then be brought into contact with the spinning bit to make the desired cut.

The major components of a router are a motor with bit receiving collet, a base and a sub-base. In order to mount a router to a router table, the prior art requires that the router be inverted and the fasteners securing the router sub-base to the router base be removed. These fasteners are typically machine screws and require the use of a tool such as a screwdriver or a hex key type wrench for removal. The sub-base is then set aside. The inverted router is then held in place beneath the work surface of the router table, and the mounting holes in the table are aligned with the mounting holes in the router base. Fasteners and an appropriate tool are then used to secure the router to the router table. It should be noted that the sub-base mounting screws are typically not long enough to serve as the router-to-table mounting screws due to the difference in thickness between the router sub-base and the router table top, and therefore additional longer screws must be obtained. It should also be noted that, once the router is secured to the table, the installation process must be reversed and the sub-base re-attached to use the router in the hand mode of operation again. It should be appreciated that the above process is somewhat difficult, time consuming and requires the use of tools and fasteners.

SUMMARY OF THE INVENTION

It is an object of this invention to provide an improved system for quickly attaching a router to a router table. In a preferred embodiment, this is accomplished without the use of tools.

DESCRIPTION OF THE PREFERRED EMBODIMENTS

Figure 1:
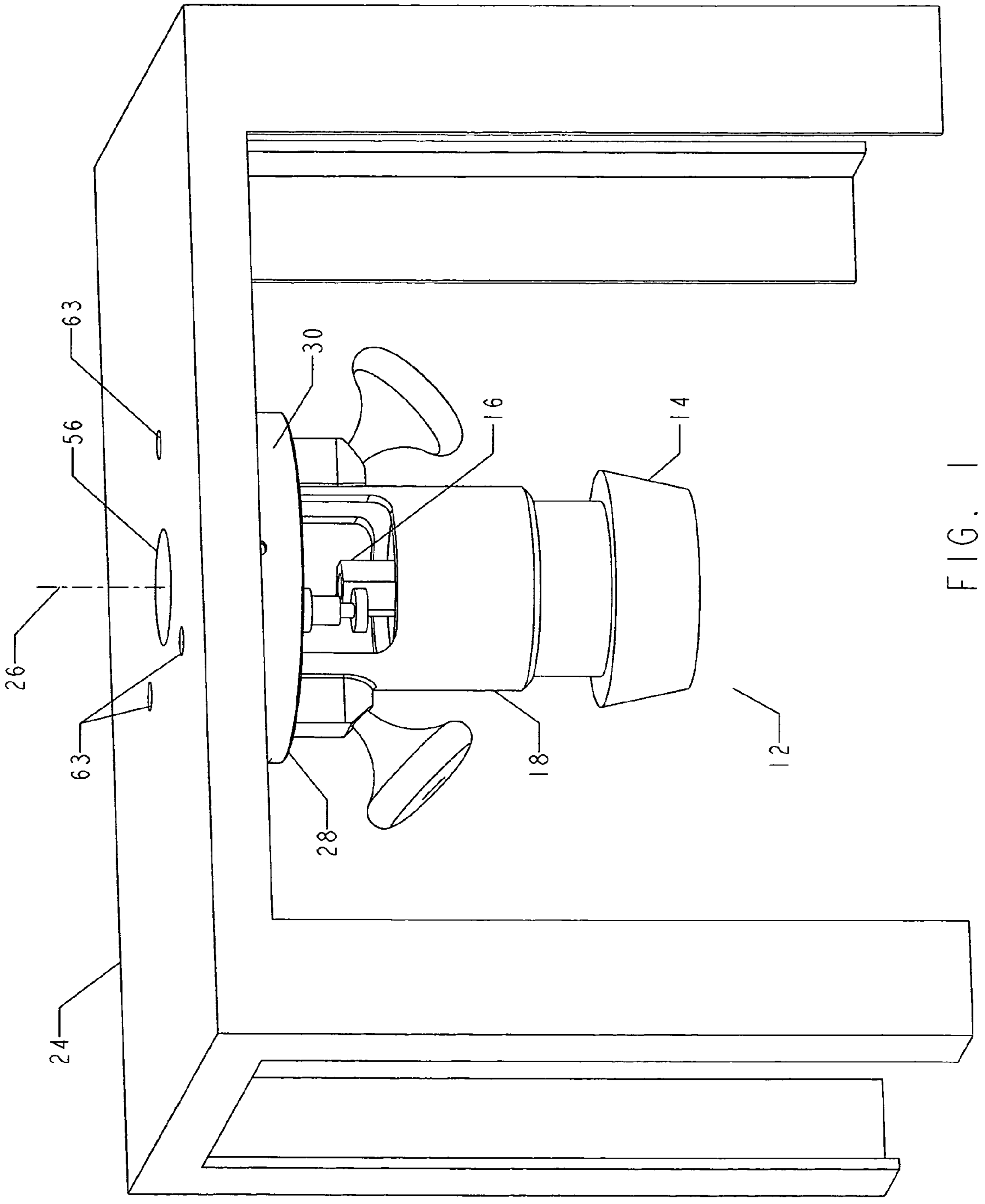
FIG. 1 is a front perspective view of a router and router table assembly made in accordance with the present invention.

FIGS. 1–4 show a first embodiment of a router table 24 and a router assembly 12. The router assembly 12, shown best in FIGS. 3 and 4, includes a motor 14, a bit receiving collet 16, a base 18, and a first sub-base 20. The router table 24 includes a second sub-base 22, shown in FIG. 2, which is very similar to the first sub-base 20. In this preferred embodiment, the motor 14 rotates the bit receiving collet 16 about a central axis 26.

The base 18 includes a circular plate 28 having a first periphery 30 and defining a first opening 32 aligned with the central axis 26. The base also has a planar top surface 34 normal to the first periphery 30 and central axis 26. The first periphery 30 of the base 18 has an internal surface which communicates with the central opening 32 and defines a plurality of radially directed recesses 36. In this preferred embodiment, these radially directed recesses 36 are in the form of heavy load bearing threads, in this case a stub acme style thread. In this case, the thread is a multiple start thread to facilitate rapid assembly of components. The radially directed recesses 36 in the base 18 are recessed from their respective radially-directed lips 37, which have a smaller inside diameter than the recesses 36. The recesses 36 and lips 37 are discontinuous and are spaced apart by the discontinuities 38 (see FIG. 2), which have an inside diameter at least as great as the inside diameter of the recesses 36.

The first sub-base 20 includes a second periphery 40 and defines a second opening 42 aligned with the central axis 26. The first sub-base also includes planar top and bottom surfaces 44, 46, which are normal to the second periphery 40 and central axis 26. The second periphery 40 includes a plurality of radially outwardly-directed projections 48. The first sub-base 20 further defines discontinuities 50 between the radially directed projections 48, such that the first sub-base 20 may be fully axially inserted into the base 18, with the projections 48 of the sub-base 20 aligned with the discontinuities 38 in the base 18, and then the sub-base may be axially rotated so that the radial projections 48 of the sub-base 20 engage the radial recesses 36 of the base 18, thereby mounting the base 18 and first sub-base 20 together. It should be understood that while a heavy, load bearing, multiple start thread is used in this preferred embodiment, radial recesses 36 and radial projections 48 may be of square, rectangular, circular or other cross-section and do not require a thread lead angle to mount base 18 and first sub-base 20 together. Also, while it is preferred that there be external projections on the sub-base and internal recesses on the base to receive those projections, it is understood that the projections could be on the base and recesses on the sub-base, and so forth, as long as the two members mate in a quick-connect manner.

Figure 2:
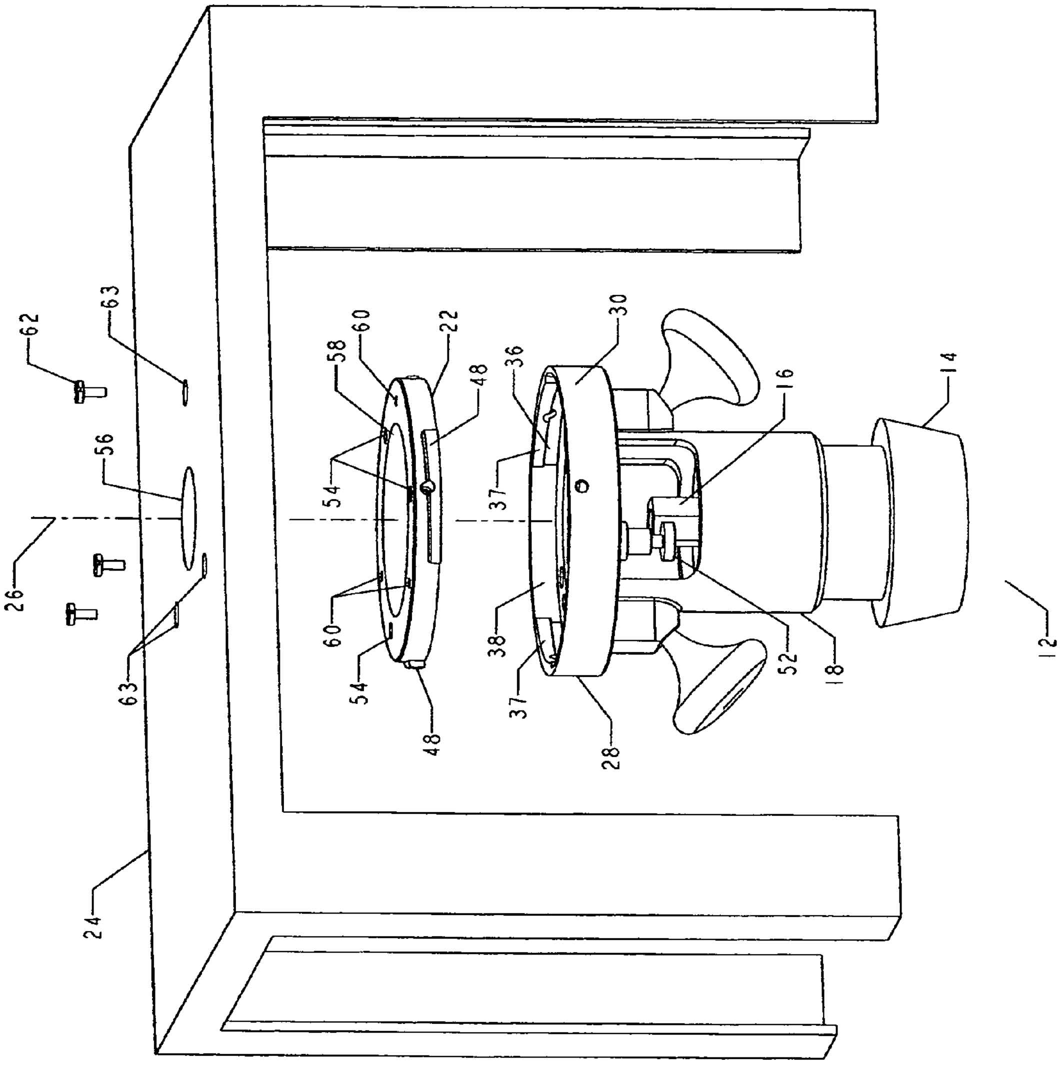
FIG. 2 is an exploded front perspective view of the assembly of FIG. 1.
Figure 3:
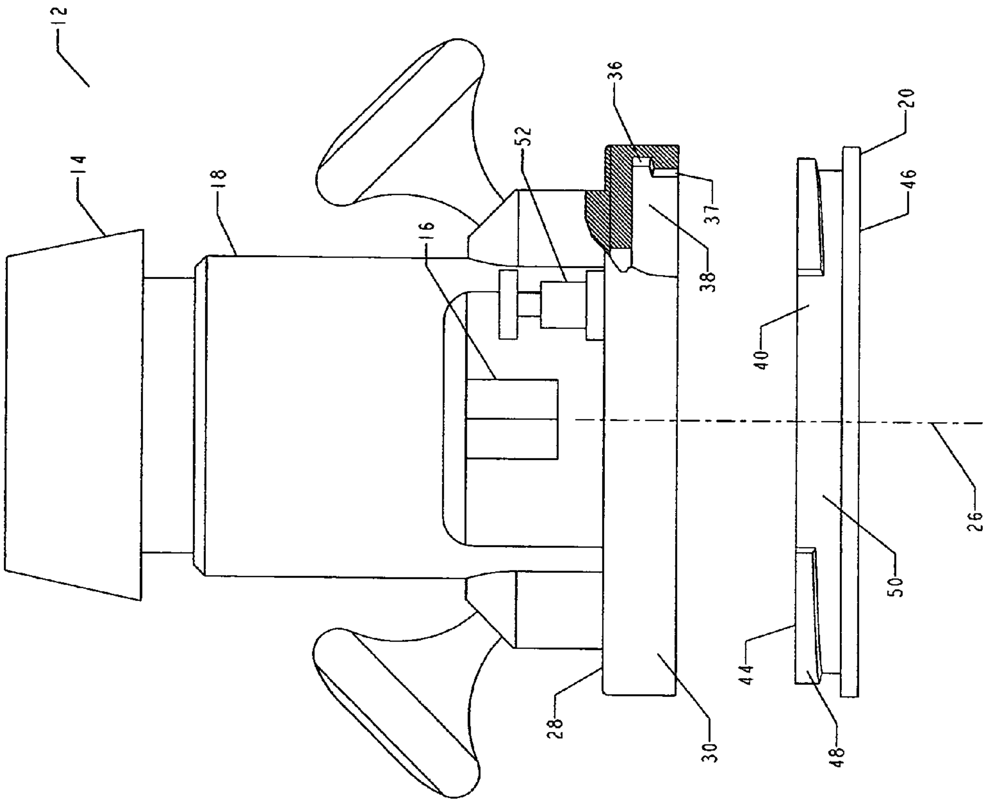
FIG. 3 is an exploded front view with partial section of the router shown in FIG. 1 but inverted for manual operation.
Figure 4:
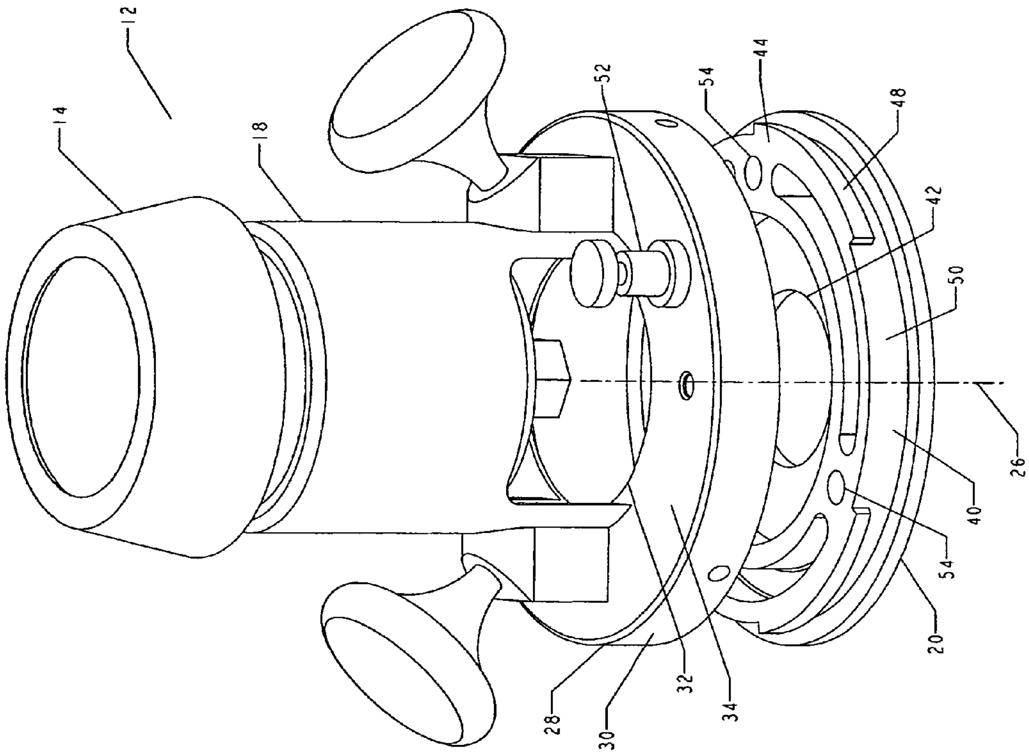
FIG. 4 is an exploded front perspective view of the router of FIG. 3.

As shown in FIG. 3, the planar bottom surface 46 of the first sub-base 20 serves as a substantially flat working surface perpendicular to the central axis 26. When the base 18 and first sub-base 20 are assembled for operation, the sub-base 20 provides a peripheral surface adjacent to the working surface 46 that is substantially smooth and continuous, so it can function as a guide surface for guiding a workpiece. As shown in FIGS. 2 and 3, the radial projections 48 on the first sub-base 20 and second sub-base 22 lie at an angle to an imaginary horizontal plane perpendicular to the central axis 26, so they function as screw threads, guiding the respective sub-base 20 or 22 to move in the direction of the central axis 26, toward and away from the base 18 as the radially directed projections 48 of the respective sub-base 20 or 22 rotate into and out of their respective recesses 36 in the base 18.

This preferred embodiment further includes a means for locking the base 18 and first sub-base 20 together to ensure against counter-rotation and undesired disassembly of the components during use. In this preferred embodiment, the locking is accomplished by use of a spring biased pin 52 disposed on the top planar surface 34 of the base 18. The spring biased pin 52 projects through the top planar surface 34 of the base 18 in a direction parallel to the axis 26 and engages a pin-receiving receptacle 54 in the first sub-base 20, thereby preventing rotation of the first sub-base 20 relative to the base 18 once those members have been assembled. In this preferred embodiment, the number of pin receiving receptacles 54 is equal to the number of radially directed recesses 36 and to the number of radially directed projections 48 in the base 18 and the first sub-base 20, respectively. This arrangement allows assembly and locking of the components at any position in which the projections 48 can engage the recesses 36 and does not require special angular orientation of the sub-base 20 relative to the base 18.

Since the locking pin 52 and receptacle 54 are internal to the peripheries of the base and sub-base, the locking mechanism is shielded from any dust and chips that may be created when the router is operating. This is also the case with the spring-biased ball locking mechanism in the second embodiment, which will be described later.

Figure 8:
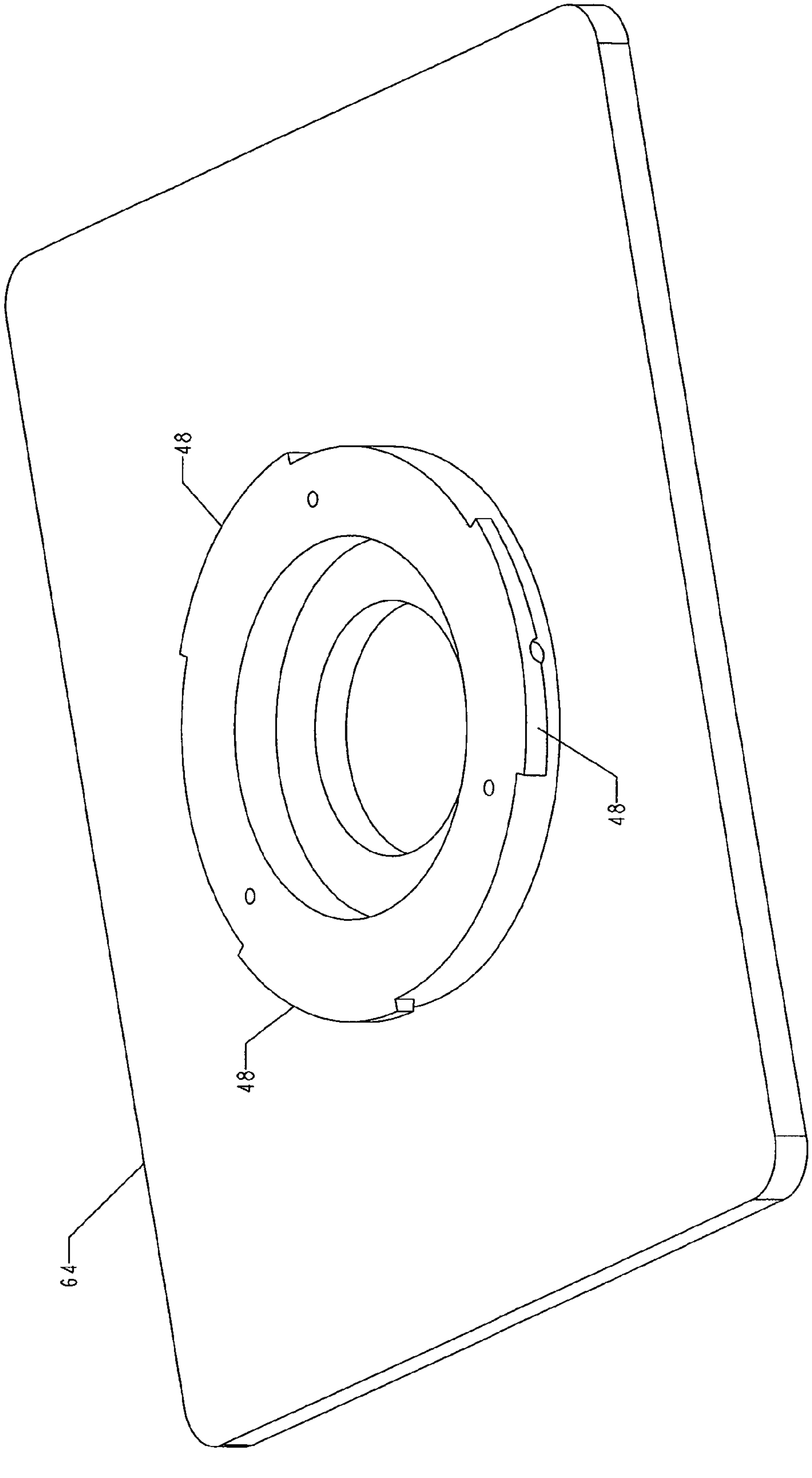
FIG. 8 is a bottom perspective view of a router table drop-in plate made in accordance with a further embodiment of the present invention.
Figure 9:
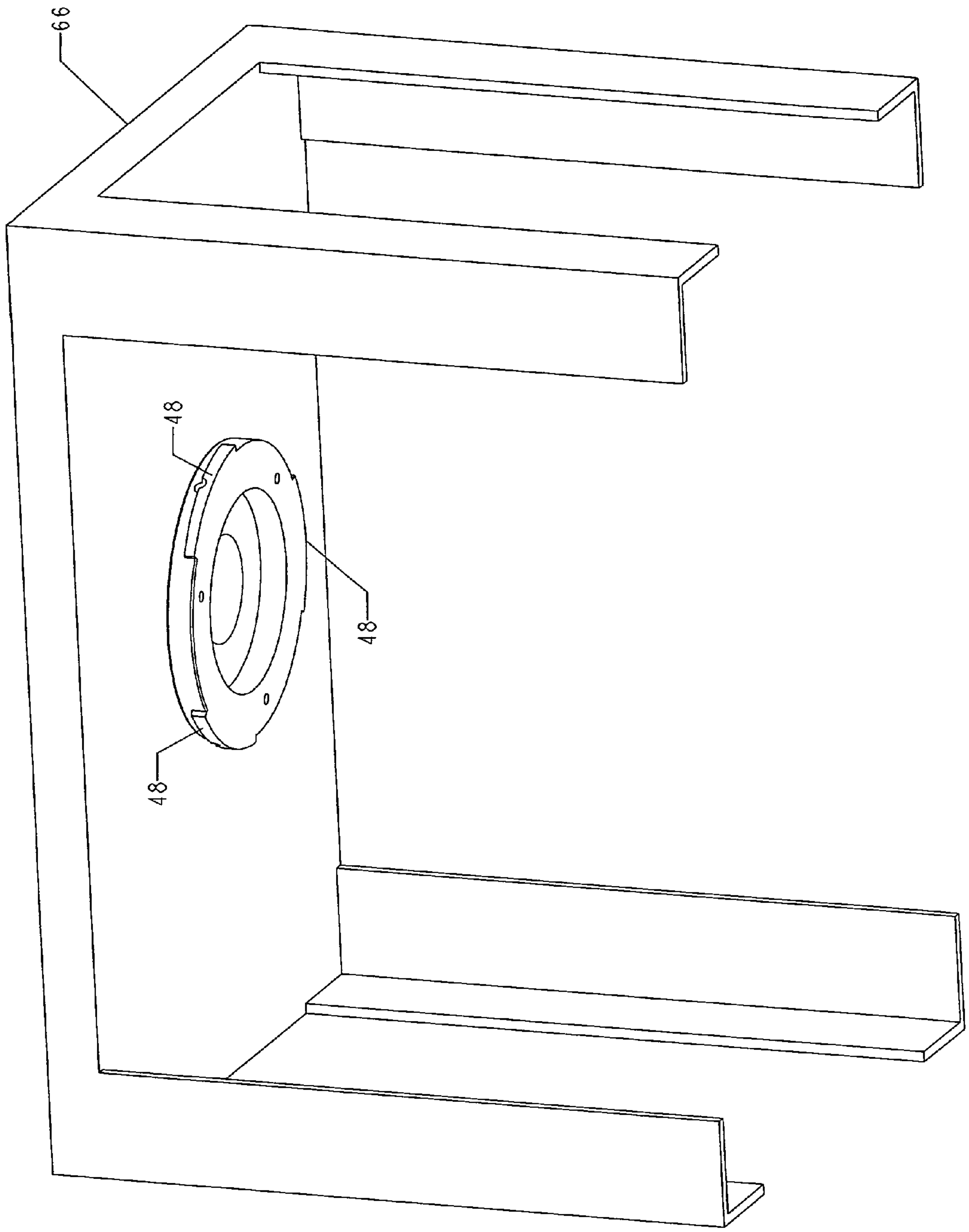
FIG. 9 is a bottom perspective view of a router table made in accordance with a further embodiment of the present invention.

Referring now to FIG. 2, the router table 24 defines a third opening 56, and the second sub-base 22 defines a fourth opening 58, wherein both openings 56 and 58 are aligned with the central axis 26. The second sub-base 22 is substantially similar to the first sub-base 20 but includes additional means for mounting the sub-base 22 to the router table 24. In this preferred embodiment, these means include a plurality of threaded holes 60 in the sub-base and a corresponding plurality of fasteners 62, which extend through openings 63 in the table 24 and are threaded into the threaded holes 60. The fasteners 62 may be common machine screws. It should be appreciated that, once the second sub-base 22 is assembled to the router table 24, it is not necessary to remove the second sub-base 22 from router table 24 for any reasons associated with normal router and router table use. The second sub-base 22 includes projections 48 that are identical to the projections 48 of the first sub-base 20, which permits the router base 18 to be attached to, or removed from, the second sub-base 22, in order to mount the router 12 onto or remove it from the router table 24. It should also be appreciated that the second sub-base 22 alternatively may be formed integral with a common router table drop-in plate 64, as shown in FIG. 8, or it may be formed integral with a router table top 66, as shown in FIG. 9.

As can be seen in FIGS. 1 and 2, the table 24 provides a substantially flat working surface. When the base 18 is assembled to the second sub-base 22, the base 30 is entirely recessed below the working surface of the table 24. The locking pin 52 and receptacle 54 are shielded from the working surface of the table 24 by being located beneath the table 24 and internal to the assembly.

Operation of the First Preferred Embodiment

For the hand mode of router operation, the first sub-base 20 is assembled to the router assembly 12. This is accomplished by aligning the first sub-base 20 with the router assembly 12, so that the projections 48 of the sub-base are aligned with the discontinuities 38 of the base 30, then moving the first sub-base 20 axially toward the base 18 until the projections 48 of the first sub-base 20 are aligned with the recesses 36 of the base 30. Then, the first sub-base 20 is rotated relative to the base 18, so the projections 48 of the sub-base enter the recesses 36 of the base 30, and then the spring biased locking pin 52 reaches one of the pin receiving receptacles 54 in the first sub-base 20 and projects into that receptacle 54, locking the members together. The first sub-base 20 is now securely assembled to the router assembly 12, and the router assembly 12 may now be used in the normal hand mode of operation.

For the router table mode of operation, the first sub-base 20 is removed from the router assembly 12, and the router assembly 12 is mounted to the router table 24. This is accomplished by first disengaging the spring biased locking pin 52, then rotating the first sub-base 20 relative to base 18 in the opposite direction from the direction that was used for assembly, and then axially withdrawing the first sub-base 20 from the base 18. The first sub-base 20 is then set aside. The router assembly 12 is then inverted and axially aligned with the second sub-base 22, which has already been secured to the underside of the router table 24 with fasteners 62 as previously described. The router assembly 12 is then axially inserted upwardly into the second sub-base 22, is rotated about the axis 26, and is then locked into position when the spring biased pin 52 engages one of the pin receiving receptacles 54 in the second sub-base 22. The router assembly 12 is now securely assembled to the second sub-base 22 and thus to the router table 24 and is now ready for the router table mode of operation. The sub-base 20 easily can be removed from the base 18 of the router assembly 12 without the use of tools or fasteners in only a few seconds. The router assembly 12 then can be attached to the router table 22 without the use of tools or fasteners, again in only a few seconds.

Description of Second Embodiment

Figure 6:
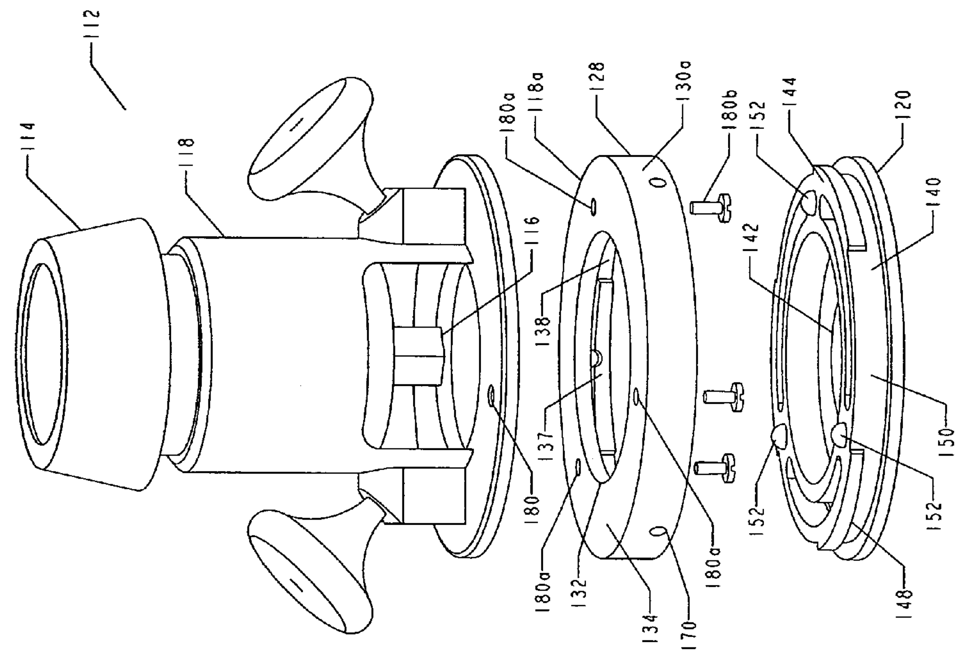
FIG. 6 is an exploded front perspective view of a router for use with the table of FIG. 5.
Figure 7:
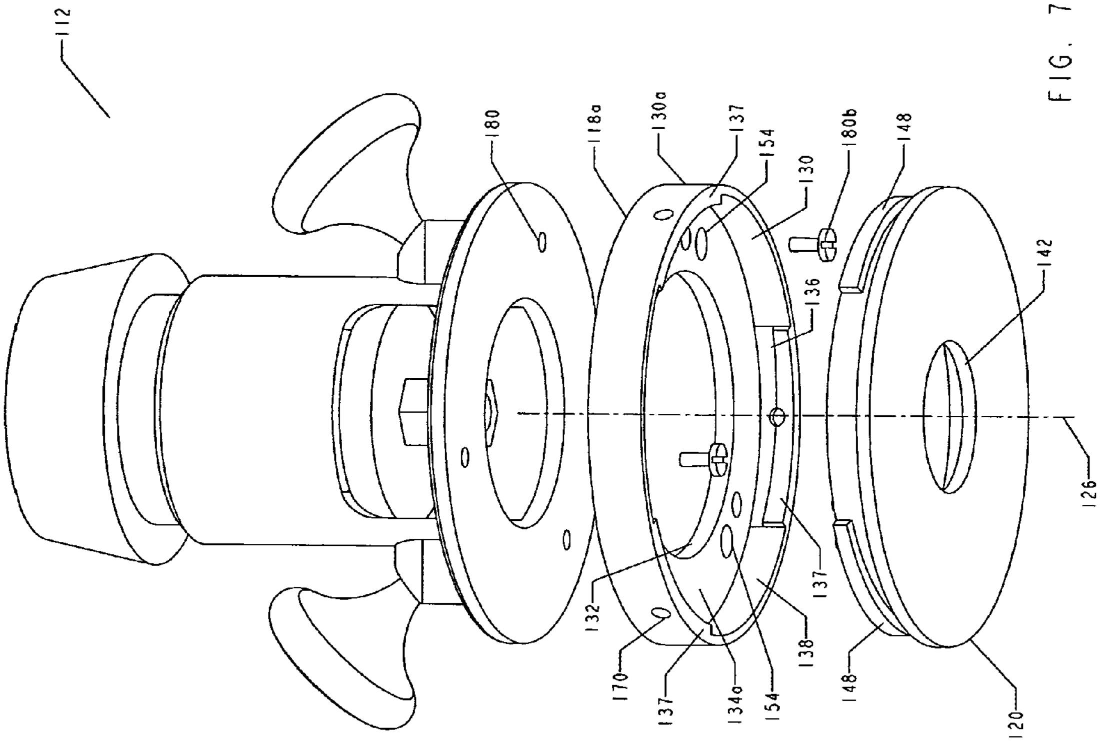
FIG. 7 is another exploded front perspective view of the router of FIG. 6.

The first preferred embodiment described above is best suited for new production of routers, wherein the radially directed recesses 36 are formed into the base 18 of the router assembly 12 during production. A second preferred embodiment, shown in FIGS. 5–7, may be used with prior art routers which have standard bases without any means for receiving a first sub-base 20 or second sub-base 22.

This embodiment includes a router assembly 112, including a motor 114 and bit receiving collet 116, a base 118, a base adapter **118*a* and a first sub-base 120. There is also a second sub-base 122 and a router table 124. In this embodiment, the motor 114 rotates the bit receiving collet 116 about the central axis 126. The base 118 includes a plurality of threaded mounting holes 180, which are part of the original manufacture of the router. The base adapter 118***a* includes a circular plate 128 with a first (internal) periphery 130 and a second (external) periphery 130*a* aligned with the central axis 126. The base adapter also defines a first opening 132. The base adapter 118*a* also includes first and second planar surfaces 134, 134*a* normal to the periphery 130 and central axis 126. The base adapter 118*a* also defines a plurality of mounting holes 180*a* through the first and second planar surfaces 134, 134*a* that align with and are coincident with the threaded mounting holes 180, permitting the base adapter 118*a* to be assembled onto the base 118 by means of fasteners 180*b*. The first periphery 130 of the base adapter 118*a* includes a plurality of radially directed recesses 136, lips 137, and discontinuities 138, which are similar to the recesses 36, lips 37, and discontinuities 38 in the first embodiment. The base adapter 118*a* further defines a plurality of pin receiving receptacles 170 extending from its second periphery 130*a* through its first periphery 130, in a direction that is normal to the central axis 126. The base adapter 118*a* further defines a plurality of ball-receiving receptacles 154 on its second planar surface 134*a*.

The first sub-base 120 has a third periphery 140, and defines a second opening 142 aligned with the central axis 126. The first sub-base 120 also has a planar surface 144 normal to the third periphery 140 and central axis 126. The third periphery 140 includes a plurality of radially directed projections 148, which are received in the recesses 136 of the base adapter 118*a*. The first sub-base 120 further includes discontinuities 138 between the radially directed projections 148, such that the first sub-base 120 may be fully axially inserted into the base adapter 118*a* with the projections 148 aligned with the discontinuities 138 and may then be rotated so that the radial projections 148 engage the radial recesses 136 to mount the base adapter 118*a* and first sub-base 120 together. It should be understood that while a heavy, load bearing, multiple start thread is shown here, the radial recesses 136 and radial projections 148 may be of square, rectangular, circular or other cross-section and do not require a thread lead angle to mount the base adapter 118*a* and first sub-base 120 together.

As with the first embodiment, this embodiment includes a means for locking the base adapter 118*a* and first sub-base 120 together to prevent counter-rotation and undesired disassembly of the components during use. This locking is accomplished by use of spring biased balls 152 projecting upwardly from and partially recessed into the planar surface 144 of the first sub-base 120. These spring biased balls 152 are biased toward the adapter 118*a* by springs (not shown), located in the recesses in the planar surface 144 in which the balls 152 reside. The spring biased balls 152 engage respective ball-receiving receptacles 154 in the base adapter 118*a*, thereby preventing unintended rotation of the first sub-base 120 relative to the base adapter 118*a*. In this embodiment, the number of spring biased balls 152 and ball-receiving receptacles 154 is equal to the number of radially-directed recesses 138 and to the number of radially-directed projections 148 in the base adapter 118*a* and the first sub-base 120, respectively. This arrangement allows assembly and locking of the components at any of the openings defined by the projections 148 and discontinuities 138.

Figure 5:
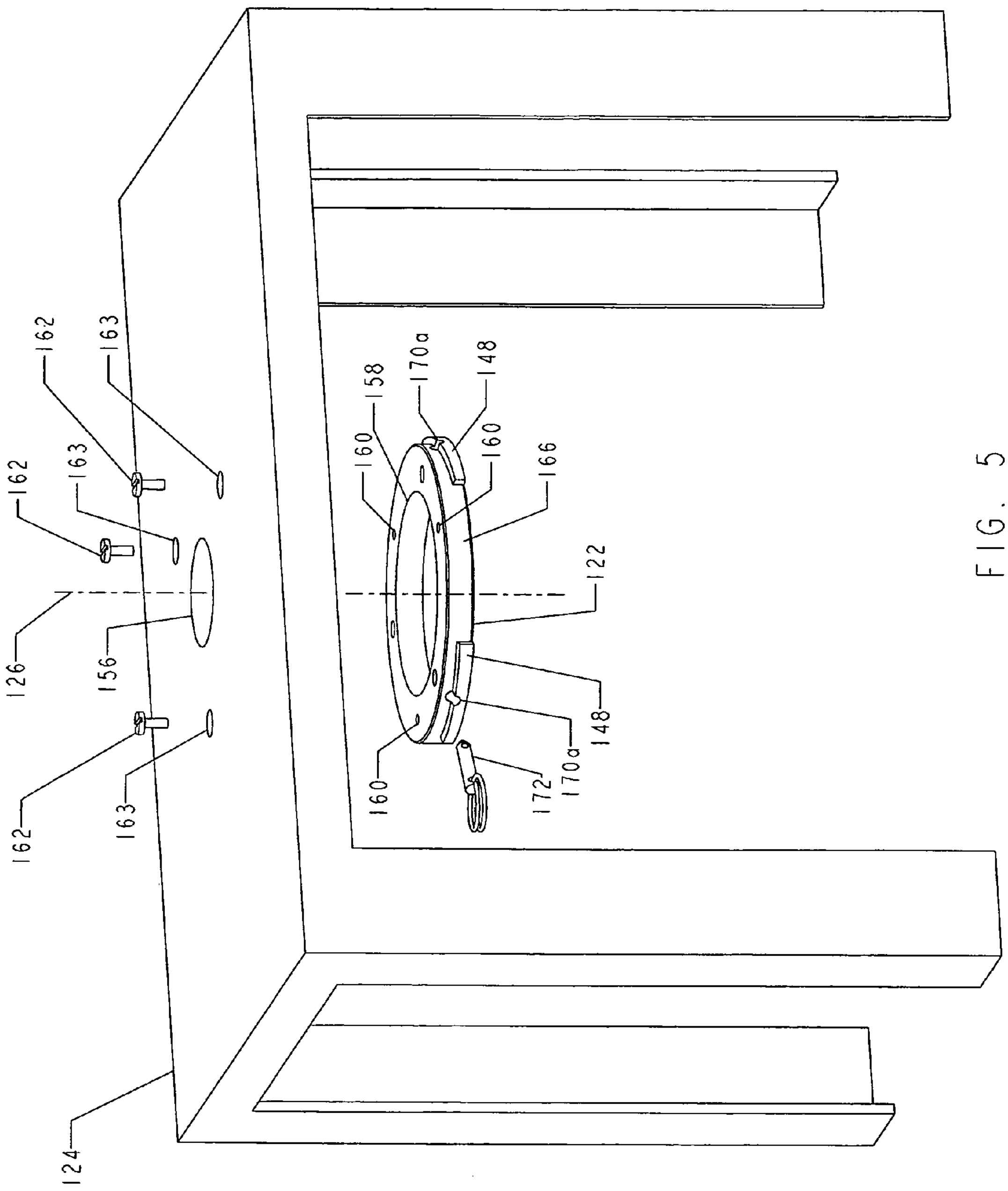
FIG. 5 is a front perspective view of a second embodiment of a router table made in accordance with the present invention.

FIG. 5 shows a second sub-base 122 that is substantially like the first sub-base 120, except that it includes means for mounting the second sub-base 122 to the router table 124. In this embodiment, these means include a plurality of internally-threaded mounting holes 160 used in conjunction with threaded fasteners 162, which extend through openings 163 in the table 124 and are threaded into the holes 160. The fasteners 162 may be common machine screws. It should be appreciated that, once the second sub-base 122 is assembled to the router table 124, it is not necessary to remove the second sub-base 122 from the router table 124 for any reasons associated with normal router and router table use. The second sub-base 122 includes a fourth periphery 166, defines a third opening 158, and defines a plurality of pin receiving receptacles 170*a* disposed about the fourth periphery 166 and normal to the central axis 126. The pin receiving receptacles 170*a* are disposed such that, upon assembly of the base adapter 118*a* to the second sub-base 122, the pin receiving receptacles 170*a* of the second sub-base 122 and the pin receiving receptacles 170 of the base adapter 118*a* are coaxially aligned. A locking pin 172 (shown in FIG. 5) may then be inserted through an aligned pair of pin receiving receptacles 170 and 170*a* to ensure against counter-rotation and undesired disassembly of the components during use. The router base 118 may easily be attached to, or removed from, the second sub-base 122 and the router table 124. It should also be appreciated that the second sub-base 122 may be formed integrally with a common router table drop-in plate or may be formed integral with a router table top.

Operation of the Second Embodiment

Referring again to FIGS. 5–7, for the hand mode of router operation, the base adapter 118*a* is assembled to the base 118 by means of industry standard fasteners such as machine screws 180*b* inserted through the mounting holes 180*a* and secured into threaded holes 180. The base adapter 118*a* then becomes part of the base 118, and the first sub-base 120 is then assembled to the base adapter 118*a*. This is accomplished by axially aligning the first sub-base 120 with the router assembly 112, with the radially directed projections 148 of first sub-base 120 aligned with the discontinuities 138 of the base adapter 118*a*, then axially inserting the first-sub-base 120 into the base adapter 118*a*, then rotating the first sub-base 120 relative to the base adapter 118*a* so the projections 148 enter their respective recesses 136, and subsequently engaging the spring biased locking balls 152 into their respective ball receiving receptacles 154 in the base adapter 118*a*. The first sub-base 120 is now securely assembled to the router assembly 112, and the router may now be used in the normal hand mode of operation.

For the router table mode of operation, the first sub-base 120 is removed from the router assembly 112, and the router assembly 112 is then inverted and mounted to the router table 124. This is accomplished by first disengaging the spring biased locking balls 152 from their respective ball receiving receptacles 154, then rotating the first sub-base 120 relative to the base adapter 118*a* and axially withdrawing the first sub-base 120 from the base adapter 118*a*. The first sub-base 120 is then set aside. The router assembly 112 is then inverted and is assembled onto the second sub-base 122 in the same manner in which it was assembled onto the first sub-base 120. The second sub-base 122 already has been secured to the underside of the router table 124 with fasteners 162 as previously described. When the pin receiving receptacles 170 in the base adapter 118*a* align with the pin receiving receptacles 170*a* in the second sub-base 122, a locking pin 172 is inserted into the aligned pin receiving receptacles 170 and 170*a*, thereby preventing reverse rotation. The router assembly 112 is now securely assembled to the second sub-base 122 and thereby to the router table 124 and is now ready for the router table mode of operation.

While two preferred embodiments of the invention have been illustrated and described in detail in the drawings and foregoing description, these are to be considered as illustrative and not restrictive in character, it being understood that only the preferred embodiments have been shown and described and that all changes and modifications that come within the spirit of the invention are desired to be protected.

The embodiments described above have many advantages over the prior art. It will be noted that alternative embodiments may not include all of the features described yet still benefit from at least some of the features. Those of ordinary skill in the art may readily devise their own implementations of the router mounting system that incorporate one or more of the features of the present invention and fall within the spirit and scope of the present invention as defined by the claims.

What is claimed is:

1. A router mounting system, comprising:
a router, including
a motor;
a collet for receiving a router bit for rotation about a central axis; and
a base having a first periphery and defining a first opening aligned with said central axis;
a first sub-base, having a second periphery, and defining a second opening aligned with said central axis;
a quick-release mounting means on said base and first sub-base, with one of said base and first sub-base having a plurality of radially-directed projections, and the other of said base and first sub-base defining recesses which receive said respective projections, thereby mounting said base and sub-base together; and
a locking means which locks said base and first sub-base against relative motion once they have been mounted together in order to prevent unintentional release of said quick-release mounting means, said locking means being located internal to said first and second peripheries in order to shield said locking means from dust and chips.

2. A router mounting system as recited in claim 1, wherein said radially-directed projections are separated by discontinuities.

3. A router mounting system as recited in claim 2, wherein said projections project radially outwardly, and in order to mount said base and sub-base together, said projections are inserted axially into said other of said base and first sub-base and then are rotated into said internal recesses, securing said base and sub-base together, wherein said projections lie at an angle to an imaginary horizontal plane perpendicular to said central axis in order to function as screw threads, guiding said first sub-base to move in the direction of the central axis toward and away from said base as the projections rotate into and out of their respective recesses.

4. A router mounting system as recited in claim 3, wherein said locking means includes a spring-loaded locking pin on one of said base and sub-base and a pin-receiving receptacle on the other of said base and sub-base which receives said spring-loaded locking pin when said base and sub-base are aligned with said projections in their respective recesses, to lock said base and sub-base together.

5. A router mounting system as recited in claim 4, wherein said projections are on said sub-base, and said recesses are on said base.

6. A router mounting system as recited in claim 5, wherein said pin-receiving receptacle and said locking pin are directed parallel to said central axis.

7. A router mounting system as recited in claim 6, wherein said pin-receiving receptacle is on said sub-base, and said locking pin is on said base.

8. A router mounting system as recited in claim 7, wherein there is a plurality of said pin-receiving receptacles on said sub-base so that said base and sub-base can lock together in a plurality of different relative angular positions.

9. A router mounting system as recited in claim 8, and further comprising a router table, defining a third opening, and a second sub-base mounted on said router table, said second sub-base having a fourth opening aligned with said third opening, said second sub-base having a quick-release mounting means which mates with said base, such that the router can quickly be disconnected from the first sub-base and mounted on the second sub-base.

10. A router mounting system as recited in claim 1, wherein said first sub-base defines a substantially flat working surface perpendicular to said central axis, and the periphery of the sub-base adjacent to said working surface is substantially smooth and continuous in order to enable said periphery to function as a guide surface for guiding a workpiece.

11. A router mounting system as recited in claim 1, and further comprising a router table, defining a third opening, and further comprising a second sub-base mounted on said router table, said second sub-base having a fourth opening aligned with said third opening, said second sub-base having a quick-release mounting means which mates with said base, such that the router can quickly be disconnected from the first sub-base and mounted on the second sub-base.

12. A router mounting system as recited in claim 1, wherein said projections are in the form of a discontinuous thread.

13. A router mounting system as recited in claim 1, wherein said base includes a housing and an adapter, which is secured to said housing, said adapter including part of said quick-release mounting means.

14. A router mounting system, comprising:
a router, including a motor and a router base; and
a router table, defining a substantially flat working surface and including a second sub-base on said router table, including means for quick connecting between said router base and said second sub-base without requiring tools or fasteners; wherein, when said base is mounted on said second sub-base, said base is entirely recessed below said working surface.

15. A router mounting system as recited in claim 14, wherein said means for quick connecting includes radially-directed projections on one of said base and sub-base and cooperating radially-directed recesses on the other of said base and sub-base.

16. A router mounting system as recited in claim 15, wherein said projections and recesses are in the form of discontinuous threads.

17. A router mounting system as recited in claim 14, wherein said second sub-base is on a drop-in plate received on said router table.

18. A router mounting system as recited in claim 14, wherein said second sub-base is secured to said router table by fasteners.

19. A router mounting system as recited in claim 14, wherein said second sub-base is integral with said router table.

20. A router mounting system as recited in claim 14, and further comprising a locking means for locking said base on said second sub-base, and shielding means for shielding said locking means from said working surface.

* * * * *